United States Patent [19]

Pegoraro

[11] Patent Number: 5,226,334
[45] Date of Patent: Jul. 13, 1993

[54] AUTOMATIC CUTTING OF MEAT AND FISH INTO PORTIONS

[75] Inventor: Giuliano Pegoraro, Irisgatan, Sweden
[73] Assignee: Nestec S.A., Vevey, Switzerland
[21] Appl. No.: 837,736
[22] Filed: Feb. 19, 1992

[30] Foreign Application Priority Data

Mar. 22, 1991 [EP] European Pat. Off. ......... 91104518.5

[51] Int. Cl.⁵ .............................................. B26D 1/12
[52] U.S. Cl. ........................................ 83/42; 83/75.5; 83/76.8; 83/365; 83/932
[58] Field of Search ..................... 83/13, 23, 42, 75.5, 83/76.8, 77, 932, 364, 365; 452/150, 156, 181, 182; 53/435, 502

[56] References Cited

U.S. PATENT DOCUMENTS

| | | | |
|---|---|---|---|
| 4,136,504 | 1/1979 | Wyslotsky | 83/77 X |
| 4,214,640 | 7/1980 | Di Rosa . | |
| 4,598,618 | 7/1986 | Kuchler . | |
| 4,718,146 | 1/1988 | Adkison . | |
| 4,794,996 | 1/1989 | Wallace et al. | 83/77 X |
| 4,868,951 | 9/1989 | Akesson et al. . | |
| 4,941,375 | 7/1990 | Kasper | 83/77 X |
| 5,054,345 | 10/1991 | Weber | 83/77 X |

Primary Examiner—Frank T. Yost
Assistant Examiner—Rinaldi Rada
Attorney, Agent, or Firm—Vogt & O'Donnell

[57] ABSTRACT

Articles of meat or fish are transported on three successively positioned conveyor belts wherein at least a part of the first conveyor belt forms a load-bearing platform of a weighing machine. A cutting device is positioned for cutting the transported articles into portions between the second and third successive conveyor belts. The cutting device is actuated by a computer which is preprogrammed with a predetermined cut portion weight. The weighing machine, a photocell positioned adjacent the first belt and weighing machine, a tachometer for determining a velocity of the second belt, and a means for feeding information to the computer operate and communicate with the computer to record and process, together with the predetermined weight, a total weight of an article transported on the first belt, a loss of weight on the first belt as an article is transported from the first belt to the second belt, and a velocity of the second belt to actuate the cutting device and cutting of the transported article to obtain a portion having the predetermined weight.

7 Claims, 1 Drawing Sheet

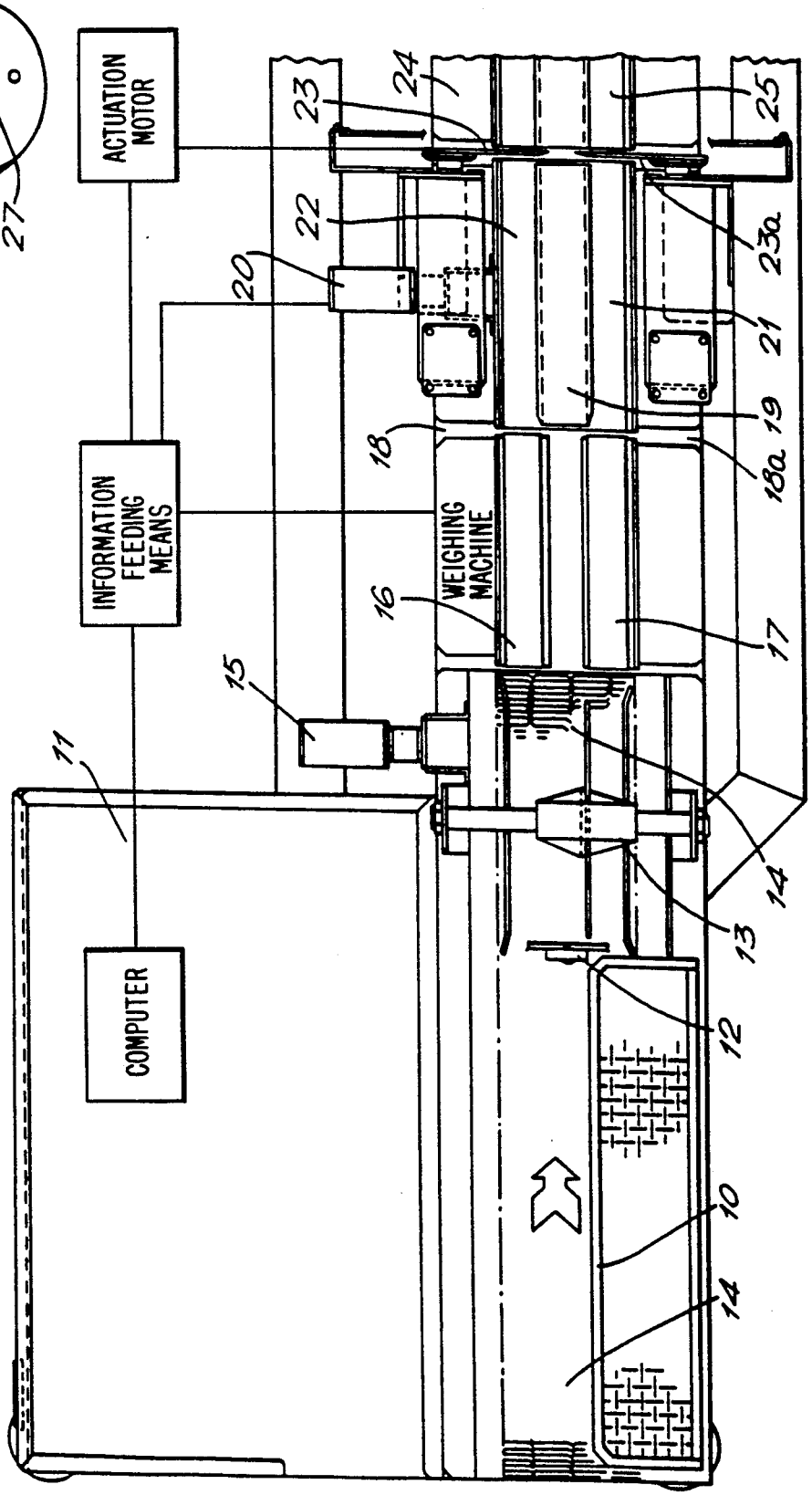

AUTOMATIC CUTTING OF MEAT AND FISH INTO PORTIONS

BACKGROUND OF THE INVENTION

The present invention relates to an apparatus and a process for the automatic cutting of meat or fish to produce portions of a predetermined constant weight.

In the production of packaged frozen meat or fish products, it is important that the weight of the portions is controlled as accurately as possible, otherwise the weights will vary at the time of filling the packages resulting in certain disadvantages. Underweight portions of incorrect weight have to be rejected leading to significant losses of fish or meat material while overweight portions have to be adjusted to the correct weight, which increases the costs.

The most reliable way of ensuring a constant weight is by cutting and weighing the portions manually. However, this is labour intensive and very time-consuming. Mechanical means for automatic and semi-automatic cutting and weighing of portions have been described but these generally involve the use of very complex, expensive machinery. For example, the use of photoelectric sensors has been proposed to detect the linear measurements of fish, but since not only the length, but also the breadth and thickness vary appreciably, this method would not lead to the cutting of portions with an accurate constant weight.

European Patent Application No. 86102704.3 describes and claims an apparatus and process for the automatic cutting of meat or fish material to produce portions of a predetermined constant weight, comprising a pair of adjacent parallel conveyors suitable for transporting a meat or fish material lying partly on each conveyor, a weighing machine and a movable cutting device characterised in that the parallel conveyors are adapted to travel in the same direction at substantially the same speed and that at least part of one of the parallel conveyors is adapted to form the load-bearing platform of the weighing machine, the weighing machine being adapted to weigh the material on the load-bearing platform and the cutting device being adapted to move transversely relative to the direction of movement of the conveyors, the direction and distance of the transverse movement being controlled by the weight recorded on the weighing machine, and then to cut the material parallel to the direction of movement.

This method is very reliable provided that the thickness of the meat or fish material does not vary too much. However, when there are wide variations in the thickness of the meat or fish pieces, it is rather difficult to maintain a constant weight.

An improvement to this apparatus and method in which the fish or meat is cut transversely to the direction of movement and, surprisingly, enables fish and meat pieces having widely varying thicknesses to be cut automatically to a predetermined constant weight.

SUMMARY OF THE INVENTION

The present invention provides a process for cutting articles of meat and fish into portions comprising programming a computer with a predetermined weight for a cut portion of an article of meat or fish, transporting an article of meat or fish on a first conveyor belt to a second conveyor belt and a third conveyor belt, weighing the article on the first belt to first determine a total weight of the article on the belt and then to determine a loss of weight on the first belt as the article is transported from the first belt to the second belt, determining a velocity of the second belt, feeding information of the determined total weight, loss of weight and velocity to the computer, processing the information together with the preprogrammed predetermined weight to actuate a cutting device so that the article is cut as the article passes between the second and third belts and cutting the article with the cutting device transversely to a direction of transport of the article to obtain a portion having a predetermined weight.

The present invention provides an apparatus for the automatic cutting of meat or fish material to produce portions of a predetermined constant weight characterised in that it comprises weighing machine three successively positioned conveyor belts for transporting articles of meat and fish from a first to a second and then to a third belt wherein at least a part of the first belt forms a load-bearing platform of the weighing machine, a cutting device positioned for cutting the articles into portions between the second and third belts, a photocell positioned adjacent the first belt and weighing machine, a tachometer for determining a velocity of the second belt, a computer preprogrammed with a cut portion weight, and means for feeding information from the weighing machine, photocell and tachometer to the computer. The arrangement is further characterized in that, in operation, the weighing machine, photocell, tachometer and feeding means operate and communicate together with the computer to record and process, together with the predetermined weight preprogrammed in the computer, a total weight of an article transported on the first belt and weighed by the weighing machine, a loss of weight on the first belt as the article is transported from the first belt to the second belt, and a velocity of the second belt to actuate the cutting device so that the article is cut transversely to a direction of travel of the article as the article passes between the second and third belts to obtain a cut portion having a predetermined weight.

There should be only one item of fish or meat material on the upstream conveyor belt at any one time.

The conveyor belts are conveniently endless belts. The conveyor belt forming the load-bearing platform of the weighing machine is conveniently fixed to the weighing machine via the axles of the rollers.

The weighing machine is conveniently of the type consisting of continuously working scales based on load cells, or it may be a spring balance.

The movement of the cutting device through the gap between the conveyor belts may be achieved by a step motor which is actuated by the computer based on the recorded information fed to it. Any kind of cutting device may be used, for example, a jet cutter, a knife or sword, preferably a rotatable sword. The gap between the conveyor belts is conveniently from 5 to 10 mm to enable the cutting device to pass through.

The tachometer may advantageously be an incremental encoder having a set number of pulses per revolution, for example, from 100 to 2000 pulses per revolution. The number of pulses per revolution is preset in the computer.

The present invention is applicable to meat and fish materials of all sizes and shapes, for example cod or salmon. The invention is particularly suitable for cutting fish tails and loins having a weight between about 100 g to 175 g, but is also applicable for cutting fillets weighing up to 700 g.

The present invention is illustrated by way of example with reference to the accompanying drawing figures.

BRIEF DESCRIPTION OF THE DRAWINGS

FIG. 1 represents a diagrammatic top plan view of an apparatus.

FIG. 2 represents a side view of a cutting device.

DETAILED DESCRIPTION OF THE DRAWINGS AND INVENTION

Referring to the drawings, the apparatus comprises a guide 10, a cabinet 11 for the electrical machinery including a computer (designated by a labeled box), a photocell 12, a pusher 13, a mesh infeed conveyor 14, belt motors 15, weighing belts 16, 17, a photocell 18, guide support 19, a tachometer 20 having 500 pulses per revolution, intermediate belts 21, 22, cutting devices 23 and outfeed belts 24, 25. A cutting device 23 is shown in FIG. 2 as a sword having a curved blade 26 and rotatable on an axis 27. In operation, cod fillets are fed onto the infeed mesh conveyor 14 in a single row guided by the guide 10 and travel in the direction of the arrow until they reach photocell 12 which gives a signal to the pusher 13 to separate the fillets alternatively into two rows travelling one at a time on weighing belts 16 and 17. The computer is preprogrammed for the predetermined weight and the number of pulses per revolution of the tachometer.

In operation, the first belt 16 provides a load bearing platform for the weighing machine (designated by a labeled box), and the weighing machine, photocell 18, tachometer 20 and information feeding means (designated by a labeled box) communicate to the computer a total weight of a fillet transported on first belt 16 and weighed by the weighing machine, a loss of weight on belt 16 as a fillet is fed to the successive, intermediate belt 22, and a transport velocity of the intermediate belt for processing based upon the preprogrammed predetermined weight to actuate the sword 23, at the appropriate position on the cod fillets as they cross the gap between belt 21 and outfeed belt 24, while being guided by the guide support 19, to rotate one turn and cut through the cod fillets to obtain pieces of the desired predetermined weight. The cut pieces are transported on belt 24 to the next stage.

In addition, in the embodiment illustrated, which shows two sets of three successive belts, the operation of the three successive belts 17, 21 and 25 and photocell 18a and sword 23a is the same as that noted for the like elements noted above, with the pusher 13 operating to separate a single line of fillets into two lines to separately feed each of first belts 16 and 17 of each set of belts.

I claim:

1. A process for cutting articles of meat and fish into portions comprising programming a computer with a predetermined weight for a cut portion of an article of meat or fish, transporting an article of meat or fish on a first conveyor belt to a second conveyor belt and a third conveyor belt, weighing the article on the first belt to first determine a total weight of the article on the belt and then to determine a loss of weight on the first belt as the article is transported from the first belt to the second belt, determining a velocity of the second belt, feeding information of the determined total weight, loss of weight and velocity to the computer, processing the information together with the preprogrammed predetermined weight to actuate a cutting device so that the article is cut as the transported article passes between the second and third belts and cutting the article with the cutting device transversely to a direction of transport of the article to obtain a portion having the predetermined weight.

2. A process according to claim 1 wherein the second belt velocity is determined by an incremental encoder tachometer having a set number of pulses per revolution and further comprising preprogramming the number of pulses per revolution in the computer.

3. An apparatus for cutting articles of meat and fish material into portions comprising:
   a weighing machine;
   three successively positioned conveyor belts for transporting articles of meat and fish from a first to a second and then to a third belt, wherein at least a part of the first belt forms a load-bearing platform of the weighing machine;
   a cutting device positioned adjacent a gap between the second and third belts for passing through the gap for cutting the articles into portions;
   a photocell positioned adjacent the first belt and weighing machine;
   a tachometer for determining a velocity of the second belt;
   a computer which is preprogrammed with a predetermined cut portion weight; and
   means for feeding information from the weighing machine, photocell and tachometer to the computer;
   wherein, in operation, the weighing machine, photocell, tachometer and information feeding means communicate with the computer to record and process a total weight of an article transported on the first belt and weighed by the weighing machine, a loss of weight on the first belt as the article is transported from the first belt to the second belt, and a velocity of the second belt for processing with the preprogrammed predetermined weight to actuate the cutting device so that the article is cut transversely to a direction of transport of the article to obtain a cut portion having the predetermined weight.

4. An apparatus according to claim 3 wherein the tachometer is an incremental encoder having a set number of pulses per revolution.

5. An apparatus according to claim 4 wherein the number of pulses per revolution is present in the computer.

6. An apparatus according to claim 3 wherein the weighing machine has working scales based on load cells.

7. An apparatus according to claim 3 wherein the cutting device is a rotatable knife.

* * * * *